United States Patent
Kimura et al.

(10) Patent No.: US 7,323,834 B2
(45) Date of Patent: Jan. 29, 2008

(54) SYNCHRONOUS MOTOR CONTROL SYSTEM

(75) Inventors: Kiyoshi Kimura, Obu (JP); Taku Itoh, Chita-gun (JP); Shigeru Yoshiyama, Kariya (JP)

(73) Assignee: Denso Corporation, Kariya, Aichi-pref. (JP)

( * ) Notice: Subject to any disclaimer, the term of this patent is extended or adjusted under 35 U.S.C. 154(b) by 329 days.

(21) Appl. No.: 11/090,004

(22) Filed: Mar. 28, 2005

(65) Prior Publication Data

US 2005/0218860 A1    Oct. 6, 2005

(30) Foreign Application Priority Data

Mar. 31, 2004  (JP)  .............................. 2004-105441

(51) Int. Cl.
*H02P 1/00* (2006.01)
(52) U.S. Cl. ...................... 318/138; 318/439; 318/254; 318/432
(58) Field of Classification Search ................ 318/138, 318/254, 439, 432
See application file for complete search history.

(56) References Cited

U.S. PATENT DOCUMENTS

| | | | | |
|---|---|---|---|---|
| 4,434,389 A | * | 2/1984 | Langley et al. | 318/254 |
| 4,859,921 A | * | 8/1989 | Archer | 318/599 |
| 5,306,988 A | * | 4/1994 | Carobolante et al. | 318/254 |
| 2003/0222617 A1 | | 12/2003 | Nakai et al. | |

* cited by examiner

*Primary Examiner*—Rina Duda
(74) *Attorney, Agent, or Firm*—Nixon & Vanderhye P.C.

(57) ABSTRACT

A synchronous motor control system includes a motor including a stator having a plurality of sets of stator teeth and phase coils, a rotor having a plurality of rotor teeth disposed opposite the stator teeth and a stopper for restricting the rotation angle of the rotor relative to the stator and a control unit for sequentially controlling electric supply to the phase coils to rotate the rotor to a prescribed rotation position. The motor is controlled by the control unit to operate through the following steps of supplying current to a specific group of the phase coils, sequentially supplying current to the phase coils to rotate the rotor in one direction at a speed not to step out of synchronization to rotate the rotor until it is stopped by the means for restricting, and sequentially supplying current to the phase coils to rotate the rotor in the other direction at a speed not to step out of synchronization until the number of times of current supply becomes a prescribed number.

16 Claims, 6 Drawing Sheets

SYNCHRONOUS MOTOR CONTROL SYSTEM

CROSS REFERENCE TO RELATED APPLICATION

The present application is based on and claims priority from Japanese Patent Application 2004-105441, filed Mar. 31, 2004, the contents of which are incorporated herein by reference.

BACKGROUND OF THE INVENTION

1. Field of the Invention

The present invention relates to a control system of a synchronous motor.

2. Description of the Related Art

In a reluctance type synchronous motor, electric supply to a plurality of phase coils is sequentially controlled to induce magnetomotive force in a plurality of stator teeth to pull rotor teeth of a rotor, thereby rotating the rotor. Usually, an encoder is employed to control the rotation angle and the number of rotations of the motor. Such an encoder generates pulse signals that correspond to the rotation of the motor. The pulse signals are counted by a control unit to detect a rotation angle of the motor, so that electric current is sequentially supplied to the phase coils.

The encoder has a permanent magnet or other parts that are fixed to the rotor and Hall effect ICs or other parts that are fixed to the stator. Because the control unit has to count many pulse signals to calculate the rotation angle or position, it has to have a large computing capacity.

SUMMARY OF THE INVENTION

Therefore, an object of the invention is to provide an improved synchronous motor control system.

A further object of the invention is to provide a synchronous motor control system in which an encoder is omitted.

According to a feature of the invention, a synchronous motor control system includes a motor having a stator with a plurality of phase coils and a rotor having a plurality of stator teeth and a control unit having a counter for counting the number of times of electric supply to the phase coils. The control operation of the control unit includes a first step of supplying current to a specific group of the stator phase coils to position or synchronize the rotor relative to the phase coils and a second step of sequentially supplying electric current to rotate the rotor until the counter counts a prescribed number of times of supplying current to the phase coils. Preferably, all the phase coils are concurrently supplied with current after current is supplied to the specific group of the phase coil to accurately position the rotor relative to the stator. The control operation may further have a third step of concurrently supplying holding current to all the phase coils when the rotor stops after the third step to hold the rotor relative to the stator. In this case, an amount of holding current in the third step is preferably less than current to rotate the rotor in the second step.

According to another feature of the invention, a synchronous motor control system including a synchronous motor having a stator with a plurality of sets of stator teeth and phase coils, a rotor with a plurality of rotor teeth disposed opposite the stator teeth and means for restricting the rotation angle of the rotor relative to the stator, and a control unit for sequentially controlling electric supply to the phase coils to rotate the rotor to a prescribed rotation position. With the above arrangement, the control unit includes a control program that is composed of a step of supplying current to a specific group of the phase coils, a step of sequentially supplying current to the phase coils to rotate the rotor in one direction at a speed not to step out of synchronization to rotate the rotor until it is stopped by the means for restricting and a step of sequentially supplying current to the phase coils to rotate the rotor in the other direction at a speed not to step out of synchronization until the number of times of current supply becomes a prescribed number. Thus, an initial rotation position can be set accurately without providing an encoder.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE PREFERRED EMBODIMENTS

A brushless synchronous motor according to a preferred embodiment of the present invention will be described with reference to FIGS. 1-8.

Figure 1A:
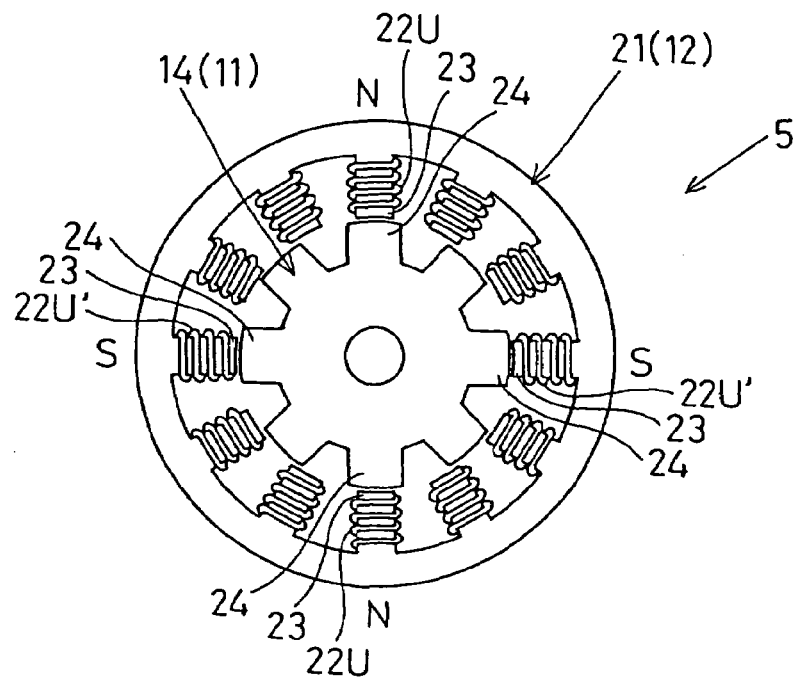
FIGS. 1A and 1B are schematic diagram illustrating a control operation of a synchronous motor control system according to a preferred embodiment of the invention.
Figure 1B:
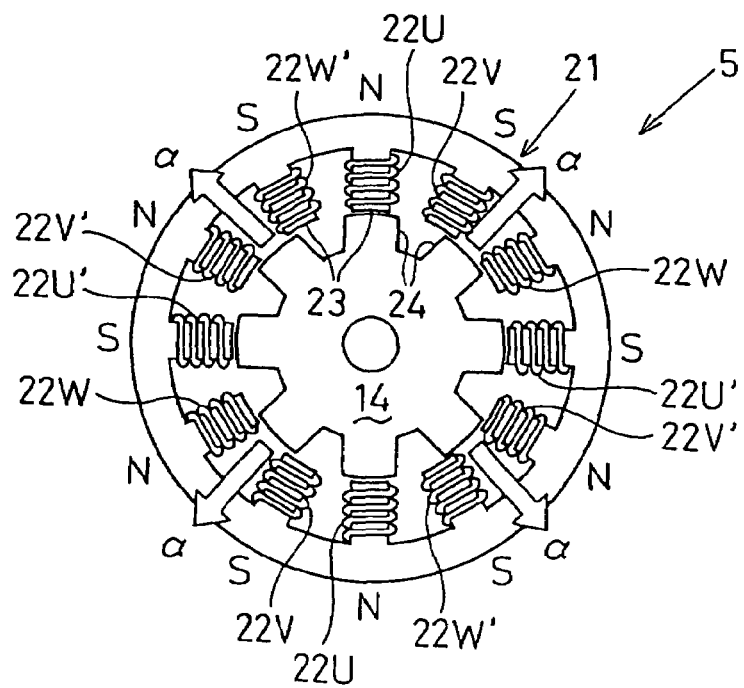
Figure 2:
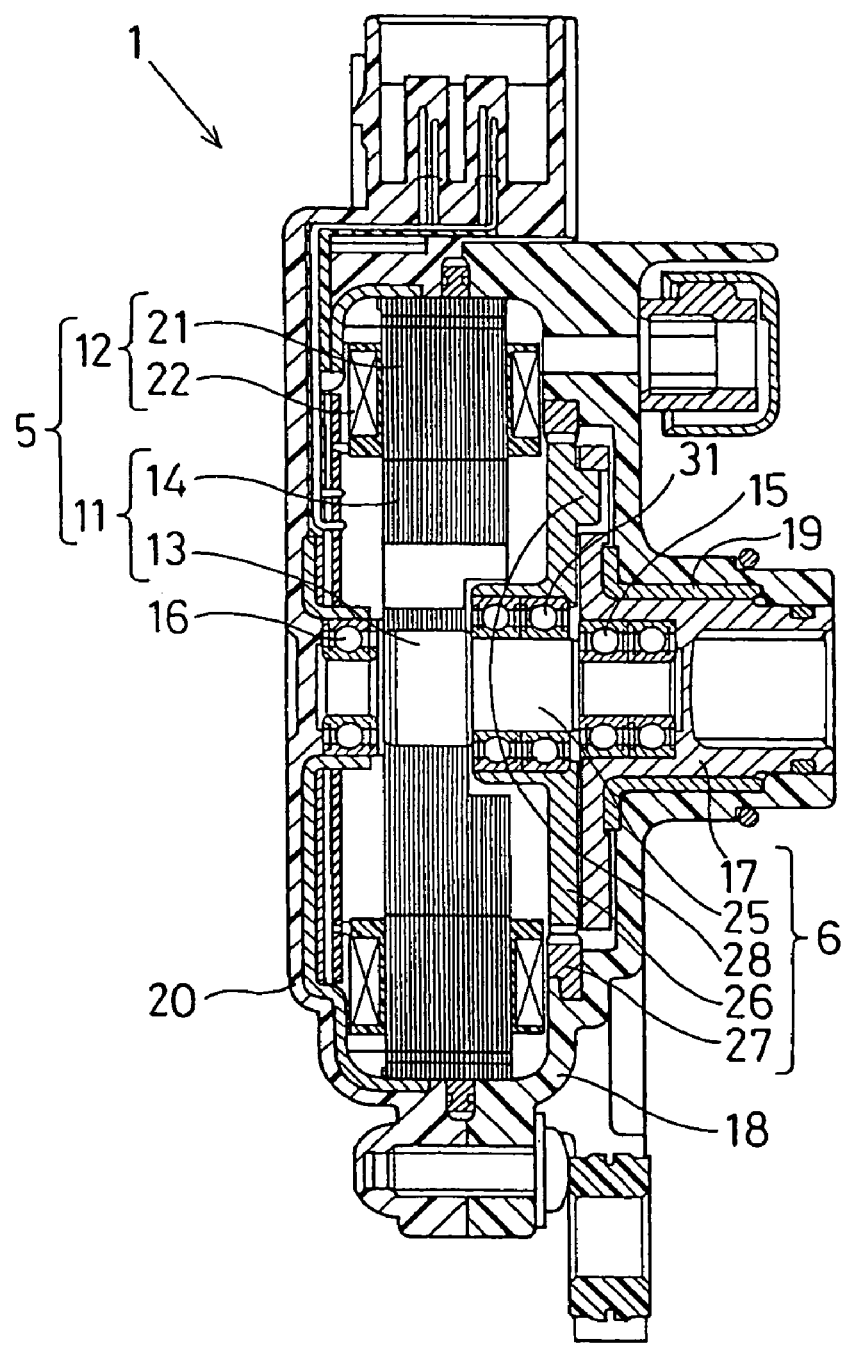
FIG. 2 is a cross-sectional side view of a rotary actuator to which the synchronous motor control system is applied.
Figure 3:
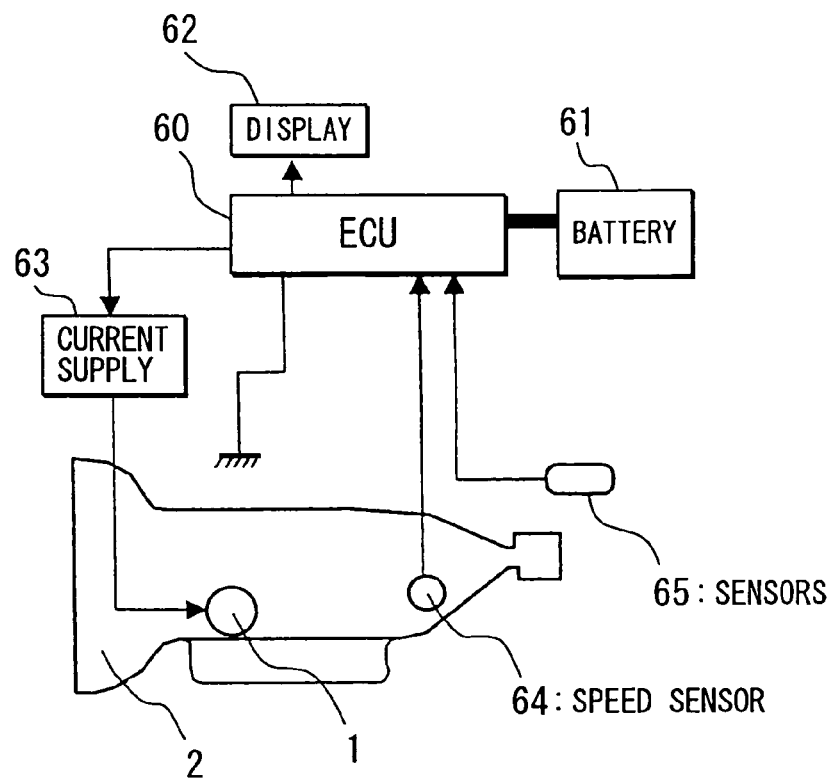
FIG. 3 is a block diagram illustrating a shift range changing system to which the synchronous motor control system is applied.
Figure 4:
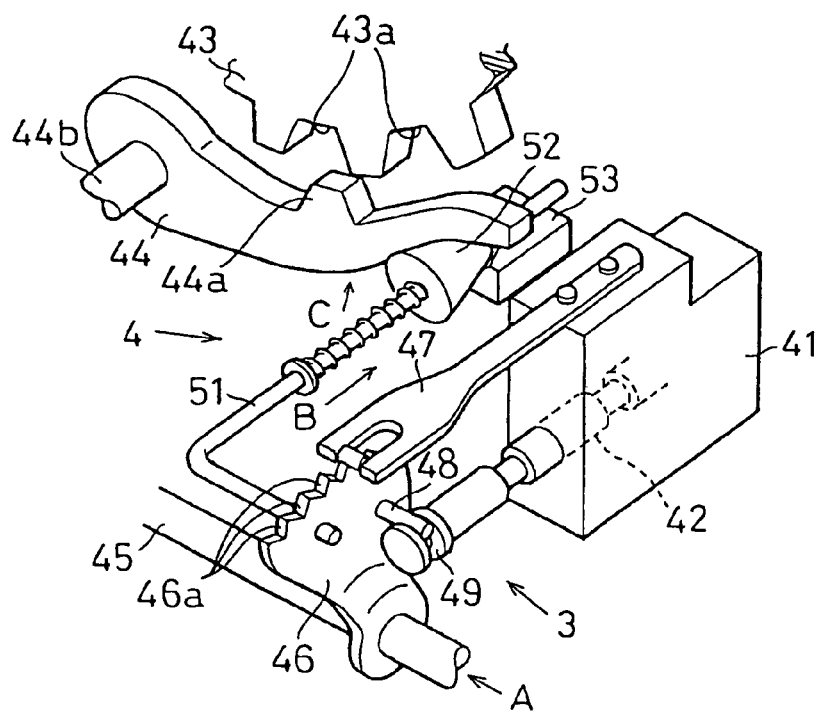
FIG. 4 is a perspective view of the shift range changing system.

Such a brushless motor is applied to a gear shift range changing system. The shift range changing system includes a rotary actuator 1 shown in FIG. 2, an automatic transmission unit 2 shown in FIG. 3 and a shift range changing unit 3, which includes a parking mechanism 4, as shown in FIG. 4.

The rotary actuator 1 operates the shift range changing unit 3. The rotary actuator 1 includes a brushless synchronous motor 5 and a speed reduction unit 6. The brushless synchronous motor 5 is a switched reluctance motor (SR motor) that is not equipped with a permanent magnet.

The motor 5 includes a rotor 11 and a stator 12, which is disposed to be coaxial with the rotor 11. The rotor 5 includes a rotary shaft 13 and a rotor core 14. The rotary shaft 13 is supported by a pair of roller bearings 15, 16 at the front (right in FIG. 2) and rear (left in FIG. 2) ends thereof.

The speed reduction unit 6 has an output shaft 17, and the front bearing 15 is fitted to the center hole of the output shaft 17. The output shaft 17 is rotatably supported by a metal bearing 19, which is fixed to the inner periphery of a front housing 18. That is, the front end of the rotary shaft 13 is supported by the front housing 18 via the metal bearing 19, which is supported by the output shaft 17 via the roller bearing 15. The metal bearing 19 is located to overlap the front roller bearing 15 in the axial direction, so that the rotary shaft 13 can be prevented from bending due to the reaction force of the speed reduction unit 6, which may be caused when a sun gear 26 engages with a ring gear 27. The rear roller bearing 16 is press-fitted to the rear end of the rotary shaft 13 and supported by the rear housing 20. That is, the outer race of the bearing 16 is fitted to an inner wall of the rear housing 20, and the inner race thereof is fitted to the outer surface of the rotary shaft 13 at its rear end.

Figure 5:
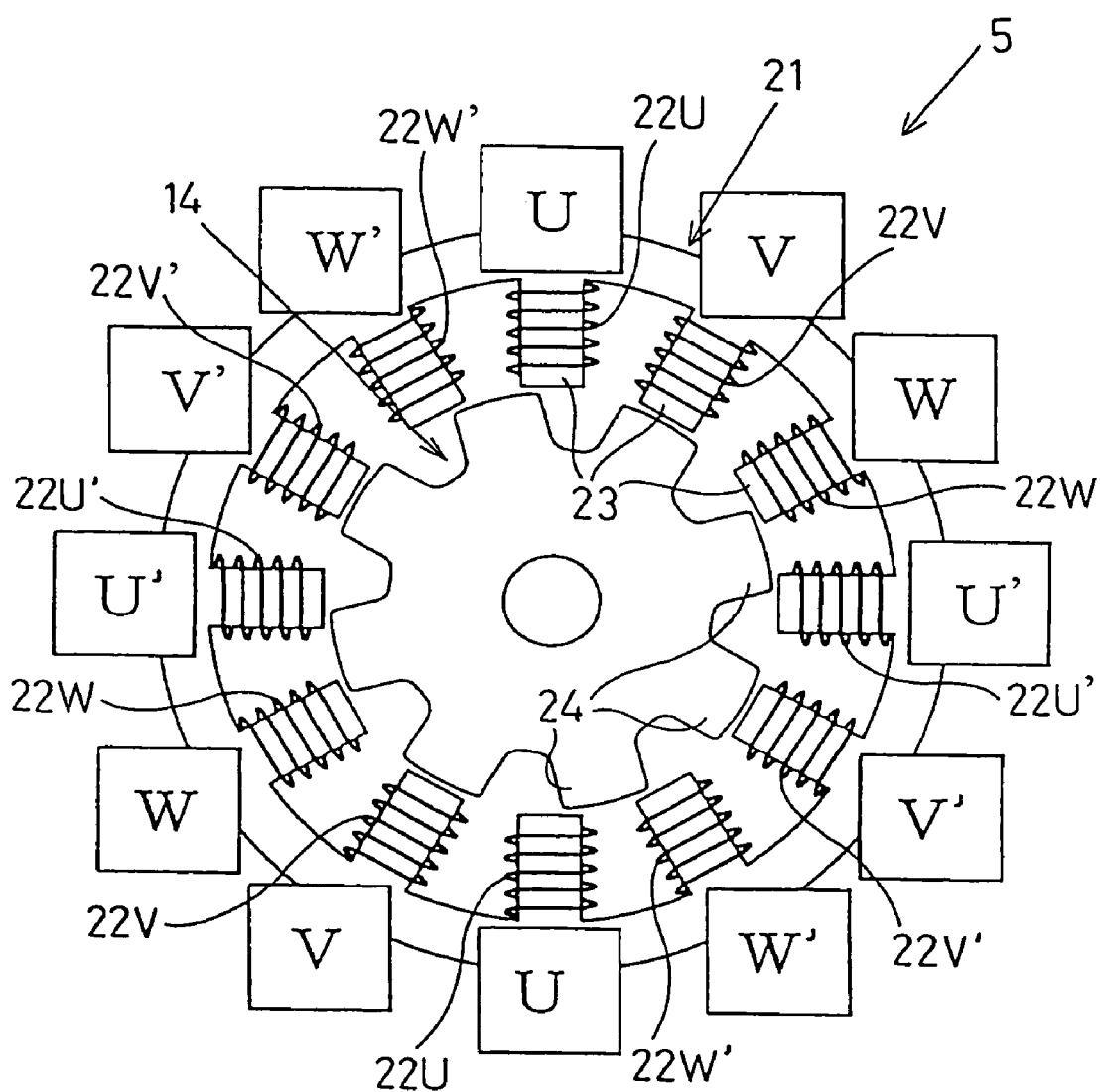
FIG. 5 is a schematic diagram of a brushless synchronous motor.

The stator 12 includes a stator core 21 and a plurality of phase coils 22 (i.e. 22U, 22U', 22V, 22V', 22W, and 22W'), as shown in FIG. 5. The phase coils 22U, 22U' correspond to phase U, the phase coils 22V, 22V' correspond to phase V, and the phase coils 22W, 22W' correspond to phase W. The stator core 21 is a laminar member of thin plates of magnetic material, which is fixed to the rear housing 20. The stator core 21 has twelve stator teeth 23 that project radially inward at intervals of 30 degrees in mechanical angle. Each of the phase coils 22 is wound around one of the stator teeth 23.

The rotor core 14 is a laminar member of thin plates of magnetic material, which is force-fitted to the rotary shaft at the center thereof. The rotor core 14 has eight rotor teeth 24 that project radially outward at intervals of 45 degrees in mechanical angle.

When electric current supply is sequentially changed from the U-phase coils to the V-phase coils and from the V-phase coils to the W-phase coils, the rotor 11 rotates clockwise by 45 degrees in mechanical angle. On the other hand, the rotor rotates counterclockwise by 45 degrees in mechanical angle when electric current supply is sequentially changed from the W-phase coils to the V-phase coils and from the V-phase coils to the U-phase coils.

Figure 6:
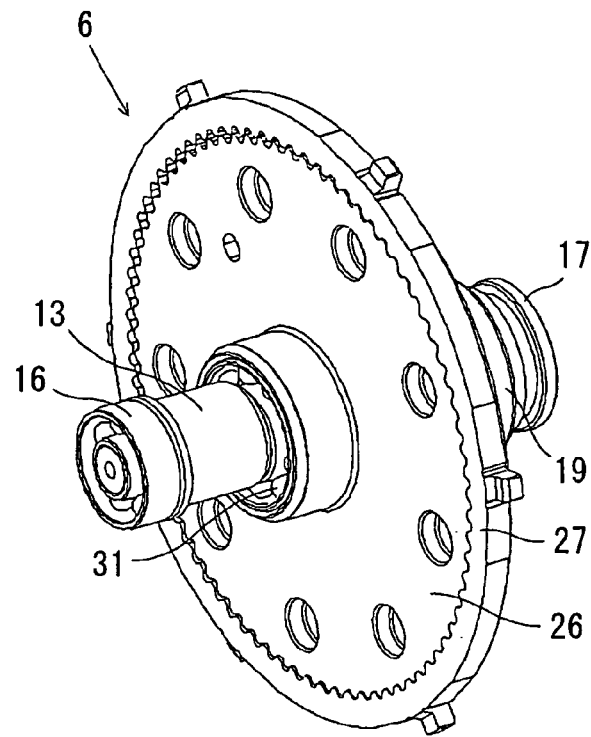
FIG. 6 is a perspective rear view of a speed reduction unit that is mounted in the rotary actuator shown in FIG. 2.
Figure 7:
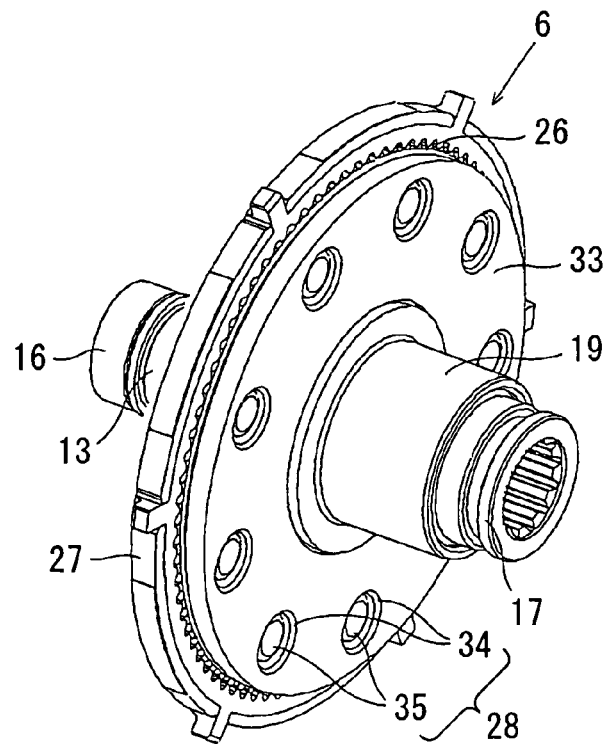
FIG. 7 is a perspective front view of the speed reduction unit.
Figure 8:
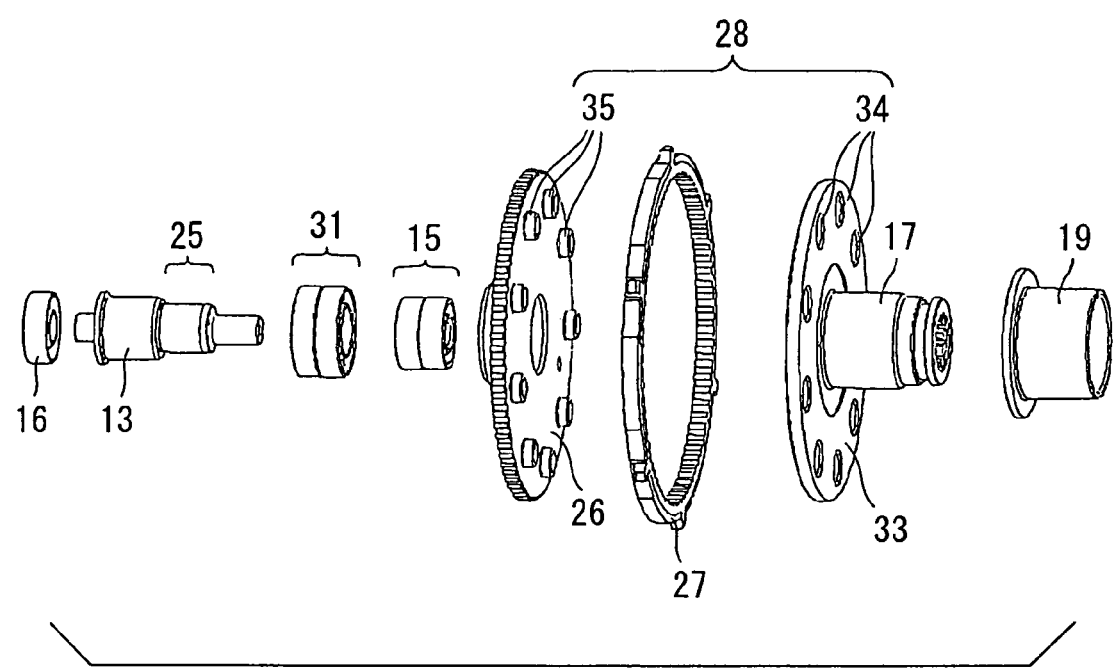
FIG. 8 is a perspective exploded view of the speed reduction unit.

The speed reduction unit 6 has a planetary gear type or a cycloid type speed reduction mechanism, as shown in FIGS. 6-8.

The speed reduction unit 6 includes an eccentric portion 25 of the rotary shaft 13, a sun gear or an inner gear 26, a ring gear or an outer gear 27 and a carrier member 28. The sun gear 26 is rotatably supported by the eccentric portion 25 via a bearing 31 to rotate eccentrically relative to the center axis of the rotary shaft and is in mesh with the ring gear 27, which is fixed to the front housing 18 shown in FIG. 2. The carrier member 28 includes a flange 33 that has a plurality of inner pin-holes 34 and as many inner pins 35 that project in the axial direction from the front surface of the sun gear 26 as the inner pin holes 34. The flange 33 is fixed to the rear end of the output shaft 17 to rotate together. The carrier member 28 transmits the rotation of the sun gear 26 to the output shaft 17 via the inner pins 35 in engagement with the inner-pin holes 34.

When the rotary shaft 13 rotates, the sun gear 26 rotates about the eccentric portion 25 at a speed lower than the rotary shaft 13. This rotation is transmitted to the output shaft 17, which is connected to a control rod 45 of the shift range changing unit 3.

Incidentally, the sun gear 26 may have the inner-pin holes 34 instead of the inner pins 35 if the flange 33 has the inner pins 35 instead of the inner-pin holes 34.

The shift range of the automatic transmission unit 2, which usually includes ranges P, R, N, D, is changed when a manual spool valve 42 of an oil pressure control box 41 is operated. Locking or unlocking of the parking mechanism 4 is carried out when a projection 44a of a parking pole 44 engages with or disengages from a recess 43a of a parking gear 43. The parking gear 43 is linked, via a differential gear, with the output shaft of the automatic transmission unit 2. Therefore, vehicle wheels are locked when the parking gear 43 is locked.

A fan-shaped detent plate 46 is fixed to the control rod 45 of the shift range changing unit 3 by means of a spring pin or the like. The detent plate 46 has a plurality of recesses 46a at the arc-shaped peripheral portion. A spring plate 47 is fixed to the pressure control box 41 and engages one of the recesses 46a to hold one of the shift ranges. The detent plate 46 has a pin 48 to drive the manual spool valve 42. The pin 48 engages an annular groove 49 formed on the manual spool valve 42. When the detent plate 46 moves the control rod rotates 45, the pin 48 moves in an arc, so that the manual spool 42 moves straight in the pressure control box 41.

When the control rod 45 rotates clockwise viewed from position A in FIG. 4, the pin 48 pushes the manual spool valve 42 via the detent plate 46 into the inside of the oil pressure control box 41. Therefore, the oil passages in the oil pressure control box 41 are changed in a direction P-R-N-D of the shift range of the automatic transmission unit 2. When the control rod 45 rotates counter-clockwise, the oil passages in the oil pressure control box 41 are changed in the other direction, that is D-N-R-P.

A park rod 51 is also fixed to the detent plate 46 to drive the parking pole 44. The park rod 51 has a conical member 52 at its one end. The conical member 52 is disposed between the parking pole 44 and a projection 53 that projects from the housing of the automatic transmission unit 2.

When the control rod 45 turns clockwise, the park rod 51 is moved by the detent plate 46 in the direction indicated by an arrow B, so that the conical member 52 lifts the parking pole 44. Consequently, the parking pole 44 rotates about its axis 44b in the direction indicated by an arrow C, so that the projection 44a of the parking pole 44 engages the recess 43a of the parking gear 43 to lock the parking mechanism 4.

When the control rod 45 turns counterclockwise, the park rod 51 is moved by the detent plate 46 opposite the direction indicated by an arrow B, so that the parking pole 44 is not lifted by the conical member 52. Consequently, the parking pole 44 is rotated by a coil spring (not shown) about its axis 44b opposite the direction indicated by the arrow C, so that the projection 44a of the parking pole 44 disengages from the recess 43a of the parking gear 43 to unlock the parking mechanism 4.

An ECU 60 controls the rotation speed and the rotation angle of the motor 5 according to a range operating unit (not shown). As shown in FIG. 3, the ECU 60 is powered by a battery 61. Reference numeral 62 represents a display that indicates a current shift range and the operational state of the rotary actuator 1. The display may include a warning lamp or a buzzer. The ECU 60 connects to a current supply circuit 63, which supplies electric current to the motor 1. Reference numeral 64 is a vehicle speed sensor, and reference numeral 65 represents various sensors such as a gear position sensor and a break switch sensor.

As shown in FIG. 3, the current supply circuits 63 is connected between the ECU 60 and the motor 5. The phase coils 22U, 22V and 22W are connected in the star arrangement, and the phase coils 22U', 22V' and 22W' are also connected in the star arrangement.

When the motor 5 is not powered, the rotation position of the motor 5 is held by the detent plate 46 and the spring plate 47 (detent mechanism). However, there is no assurance that the rotor 11 is not moved. Even if a motor switch is turned off at P position of the shift range, accurate position of the rotor 11 can not be detected because the P position of the shift range covers ±2 degrees in mechanical angle, which corresponds to ±154 degrees of the rotation angle.

The ECU 60 includes a learning control program which supplies current to a specific phase coils 22U, 22U' (e.g. U-phase and U'-phase coils). When only the phase coils 22U, 22U' are supplied with current, rotor teeth 24 that are located near the phase coils 22U, 22U' are pulled thereto so that initial synchronization of the rotor 11 relative to the stator 12 can be almost settled. After a prescribed time in which rotor vibration completely stops, the learning program commands to supply current to the phase coils 22V, 22V', 22W and 22W', so that the rotor teeth are pulled by the phase coils 22V, 22V', 22W and 22W' to be completely settled, as indicated by reference character α in FIG. 1B. Thus, the initial synchronization is completed.

The output shaft 17 has a pair of stopper walls (e.g. a P range side stopper and a D range side stopper) for restricting the rotation angle (e.g. 40 degrees) thereof.

The ECU 60 sequentially changes the current supply to the phase coils 22 at an open-control speed not to step out of synchronization to rotate the output shaft in one direction (e.g. toward the P range side stopper) until it is stopped by one of the stoppers (e.g. the P range side stopper).

When the output shaft 17 is stopped, the ECU 60 resets a counter, and sequentially supplies current to the respective phase coils at an open-control speed not to step out of synchronization to rotate in the other direction and makes the counter count the number of times of current supply to the respective phase coils 22 until the number becomes a predetermined number. Thus, the initial rotation position of the output shaft 17 is set.

When a range changing command is given by the range operating unit to the ECU 60, it calculates a target count number that is necessary to rotate the output shaft 17 from the initial rotation position based on a difference between the initial rotation position of the output shaft 17 and a target rotation position. The ECU 60 rotates the output shaft 17 until the target count number is counted at the open-control speed not to step out of synchronization by use of the learning program, thereby rotating the output shaft 17 to the target rotation position.

The ECU 60 is programmed to concurrently supply current to all the phase coils 22 to position the stator teeth 23 and the rotor teeth 24 correctly when the output shaft 17 and the rotor 11 have rotated to the target rotation position and stop in the same manner as the initial rotation position setting described above.

When the rotor 11 (with the output shaft 17) stops, the ECU 60 supplies a less amount of holding current to the respective coils 22 than the current supplied when it rotates the rotor 11. The less the holding current, the more power saving.

Incidentally, the switched reluctance motor (SR motor) may be replaced by another motor such as a synchronous reluctance motor, or a synchronous motor having permanent magnets (SPM or IPM). The cycloid type speed reduction unit may be replaced by a planetary gear type speed reduction unit, or by a speed increasing unit. The rotary actuator may be replaced by a different type rotary actuator for changing the phase angle of a cam shaft.

In the foregoing description of the present invention, the invention has been disclosed with reference to specific embodiments thereof. It will, however, be evident that various modifications and changes may be made to the specific embodiments of the present invention without departing from the scope of the invention as set forth in the appended claims. Accordingly, the description of the present invention is to be regarded in an illustrative, rather than a restrictive, sense.

What is claimed is:

1. A synchronous motor control system comprising:
   a poly-phase motor including a stator having a plurality of sets of stator teeth and phase coils and a rotor having a plurality of rotor teeth disposed opposite the stator teeth, each set of the phase coils corresponding to one phase of the poly-phase;
   a current supply circuit for supplying electric current to the phase coils; and
   a control unit for controlling the current supply circuit to supply electric current to the phase coils,
   wherein:
   said control unit counts the number of times current is supplied to the motor and controls said motor according to a control program comprising:
   supplying current to only a specific one set of the phase coils to position the rotor at a predetermined position of rotor teeth relative to the phase coils and stator teeth; and
   thereafter sequentially supplying electric current to the phase coils to rotate the rotor until the number of current supply times becomes a prescribed number.

2. The synchronous motor control system as claimed in claim 1, wherein the positioning of the rotor relative to the phase coils further includes concurrently supplying current to all the phase coils after supplying current to the one specific set of the phase coils.

3. The synchronous motor control system as claimed in claim 1, wherein the control program further holds said rotor in a desired position relative to said stator by concurrently supplying holding current to all the phase coils when the rotor stops in said desired position.

4. The synchronous motor control system as claimed in claim 3, wherein said holding current is of less magnitude than current used to rotate the rotor.

5. A synchronous motor control system comprising:
   a poly-phase motor including a stator having a plurality of sets of stator teeth and phase coils, a rotor having a plurality of rotor teeth disposed opposite the stator teeth and means for restricting rotation of the rotor relative to the stator beyond a predetermined limit, each set of the phase coils corresponding to one phase of the poly-phase; and
   a control unit for sequentially controlling an electric supply to the phase coils to rotate the rotor to a prescribed rotation position,
   wherein said control unit includes a control program comprising:
   supplying current to only one specific set of the phase coils;
   thereafter sequentially supplying currents to the phase coils to rotate the rotor in one direction at a speed not to step out of synchronization until the rotor is stopped by the means for restricting; and
   thereafter sequentially supplying currents to the phase coils to rotate the rotor in the other direction at a speed not to step out of synchronization until the number of times of current supply becomes a prescribed number.

6. The synchronous motor control system as claimed in claim 5, wherein said control program further comprises concurrently supplying current to all the phase coils after supplying current to the one specific set of the phase coils prior to rotating the rotor in said one direction.

7. The synchronous motor control system as claimed in claim 6, wherein said control program further comprises concurrently supplying holding current to all the phase coils when the rotor stops after the number of times of current supply becomes a prescribed number.

8. The synchronous motor control system as claimed in claim 7, wherein the holding current is of less magnitude than current used to rotate the rotor.

9. A method for controlling the rotor position of a polyphase synchronous motor having plural sets of phase coils magnetically coupled to respectively corresponding stator teeth and a magnetically permeable rotor having plural rotor teeth disposed opposite the stator teeth, said method comprising:
(a) energizing only a single set of said phase coils to position said rotor teeth at a predetermined starting relationship with respect to said stator teeth; and
(b) thereafter sequentially energizing said sets of phase coils to rotate the rotor from said predetermined starting relationship.

10. A method as in claim 9 further comprising:
(c) after step (a) but before step (b) concurrently energizing all sets of said phase coils to stabilize the rotor at said predetermined starting relationship.

11. A method as in claim 9 further comprising:
(c) continuing step (b) until a rotation-stopping restriction is encountered by said rotor; and
(d) after step (c), sequentially energizing said sets of phase coils to rotate the rotor in an opposite direction to a predetermined position relative to said rotation-stopping restriction by energizing said sets of phase coils a predetermined number of times in said opposite direction.

12. A method as in claim 11 further comprising:
(e) concurrently energizing all sets of said phase coils to stabilize the rotor at said predetermined position.

13. A method as in claim 12 further comprising:
(f) sequentially energizing said phase coils another predetermined number of times to cause rotation of said rotor to another predetermined position; and
(g) again concurrently energizing all sets of said phase coils to stabilize the rotor at said another predetermined position.

14. A method as in claim 10 wherein the electrical current used to stabilize the rotor is of less magnitude than the electrical current used to rotate the rotor.

15. A method as in claim 12 wherein the electrical current used to stabilize the rotor is of less magnitude than the electrical current used to rotate the rotor.

16. A method as in claim 13 wherein the electrical current used to stabilize the rotor is of less magnitude than the electrical current used to rotate the rotor.

* * * * *